United States Patent
Rybakov et al.

(10) Patent No.: US 9,697,608 B1
(45) Date of Patent: Jul. 4, 2017

(54) APPROACHES FOR SCENE-BASED OBJECT TRACKING

(71) Applicant: Amazon Technologies, Inc., Reno, NV (US)

(72) Inventors: Oleg Rybakov, Seattle, WA (US); Avinash Aghoram Ravichandran, Seattle, WA (US); Daniel Bibireata, Seattle, WA (US); Ajay Kumar Mishra, Bellevue, WA (US); Wei Zhang, Seattle, WA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 327 days.

(21) Appl. No.: 14/301,599

(22) Filed: Jun. 11, 2014

(51) Int. Cl.
*G06K 9/00* (2006.01)
*G06T 7/00* (2017.01)
*H04N 7/18* (2006.01)

(52) U.S. Cl.
CPC ........... *G06T 7/0044* (2013.01); *H04N 7/183* (2013.01)

(58) Field of Classification Search
CPC . H04N 7/183; H04N 13/0264; G06K 9/00624
USPC ......................................................... 348/142
See application file for complete search history.

(56) References Cited

U.S. PATENT DOCUMENTS

2010/0305857 A1* 12/2010 Byrne ................... G06T 7/0042
                                                              701/301

OTHER PUBLICATIONS

Meidow, Jochen. "Efficient video mosaicking by multiple loop closing." Photogrammetric Image Analysis. Springer Berlin Heidelberg, 2011. 1-12.*
Fan, Quanfu, et al. "Matching slides to presentation videos using SIFT and scene background matching." Proceedings of the 8th ACM international workshop on Multimedia information retrieval. ACM, 2006.*
Zhai, Yun, and Mubarak Shah. "Visual attention detection in video sequences using spatiotemporal cues." Proceedings of the 14th ACM international conference on Multimedia. ACM, 2006.*
Chen, Han, et al. "Scalable alignment of large-format multi-projector displays using camera homography trees." Proceedings of the conference on Visualization'02. IEEE Computer Society, 2002.*

(Continued)

*Primary Examiner* — Jeffery Williams
(74) *Attorney, Agent, or Firm* — Polsinelli LLP

(57) ABSTRACT

A computing device can be configured to analyze information, such as frames captured in a video by a camera in the computing device, to determine locations of objects in captured frames using a scene-based tracking approach without individually having to track the identified objects across the captured frames. The computing device can track scenes, a global planar surface, across newly captured frames and the changes to (or transformation) the scene can be used to determine updated locations for objects that were identified in previously captured frames. Changes to the scene between frames can be measured using various techniques for estimating homographies. An updated location for the particular object in the currently captured frame can be determined by adjusting the location of the object, as determined in the previously captured frame, with respect to the transformation of the scene between the previously captured frame and the currently captured frame.

19 Claims, 8 Drawing Sheets

(56) References Cited

OTHER PUBLICATIONS

Dubrofsky, Elan. Homography estimation. Diss. University of British Columbia (Vancouver, 2009).*
Grundmann, Matthias, et al. "Calibration-free rolling shutter removal." Computational Photography (ICCP), 2012 IEEE International Conference on. IEEE, 2012.*

* cited by examiner

US 9,697,608 B1

APPROACHES FOR SCENE-BASED OBJECT TRACKING

BACKGROUND

People can utilize a camera of a device to capture an image of an object. For example, a user can use a camera to capture a still image or video of things in the environment in the camera's field of view. There might be multiple objects in the captured image or video. In some instances, the multiple objects may need to be tracked as the device moves to be able to provide various features. For example, the multiple objects may need to be tracked so that augmented reality techniques can be accurately applied to the captured image or video to insert virtual objects. However, tracking multiple objects using the device can put a strain on computing resources and on device's battery life.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to tracking multiple objects in images or a video. In particular, various embodiments enable a computing device to analyze information, such as sensor data (e.g., video frames) captured by one or more sensors of the computing device, to determine locations of objects in captured frames using a scene-based tracking approach without individually having to track the identified objects across the captured frames. That is, changes to a scene (a global planar surface) can be tracked across newly captured frames and these changes can be used to identify an updated location for an object that was identified in a previously captured frame.

For example, for a particular object that was identified in a previously captured frame, the location of the particular object in the previously captured frame can be determined, for example, in the form of a bounding box. As new frames are captured, changes to the scene from the previously captured frame in which the particular object was identified can be determined with respect to a currently captured frame. These changes (or transformation) can be measured, for example, using various techniques for estimating homographies, e.g., Random Sample Consensus (RANSAC). An updated location for the particular object in the currently captured frame can be determined by adjusting the location of the object in the previously captured frame with respect to the transformation of the scene between the previously captured frame and the currently captured frame. In other words, the object can be identified in the currently captured frame based on changes to the scene between frames without having to individually track the particular object separately across each captured frame.

Using this scene-based tracking approach, multiple objects can be tracked across frames without having to individually track each object. As a result, the strain on computing resources and device battery life is reduced.

Various other applications, processes and uses are presented below with respect to the various embodiments.

Figure 1A:
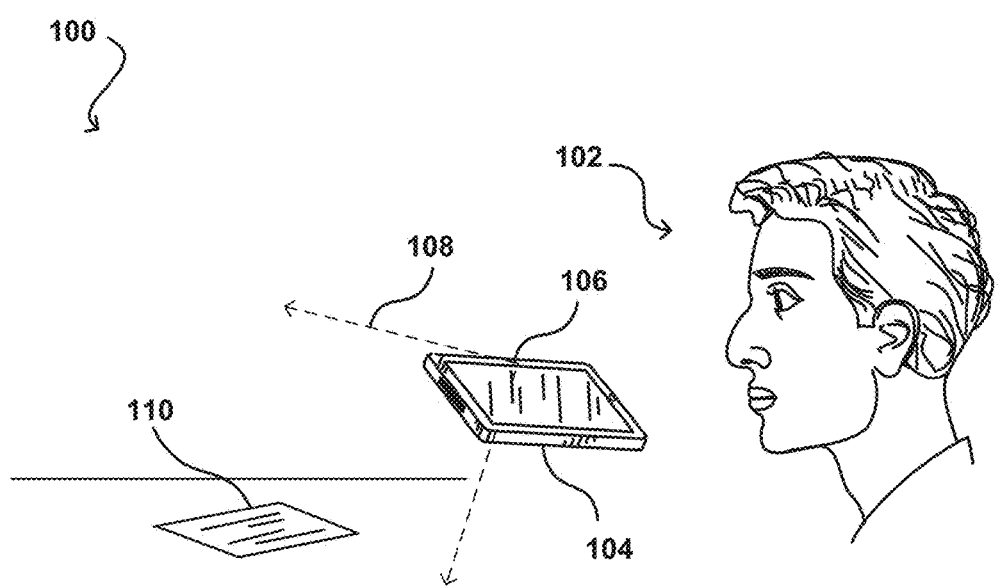
FIGS. 1(a)-(c) illustrates an example of a user using a portable computing device to capture an image of an object that can be utilized in accordance with various embodiments.

FIG. 1(a) illustrates an example situation 100 wherein a user 102 is interacting with a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a particular document 110. This could include, for example, information contained in the document or information about the document itself, among other such information.

In this example, the document 110 contains information that might be of interest to the user. This information includes, for example, a body of text, a phone number, and a web address. The user might want to acquire any or all of this information for any of a number of reasons, such as to update contact information, call the number, access a Web site associated with the address, and so on. In order to obtain this information, the user can position the computing device 104 such that at least the relevant portion of the document 110 is within a field of view 108 of at least one camera 106 of the computing device. The resulting image can then be displayed on a display screen 116 of the computing device 104, as illustrated in the example situation 120 of FIG. 1(b).

Figure 1B:
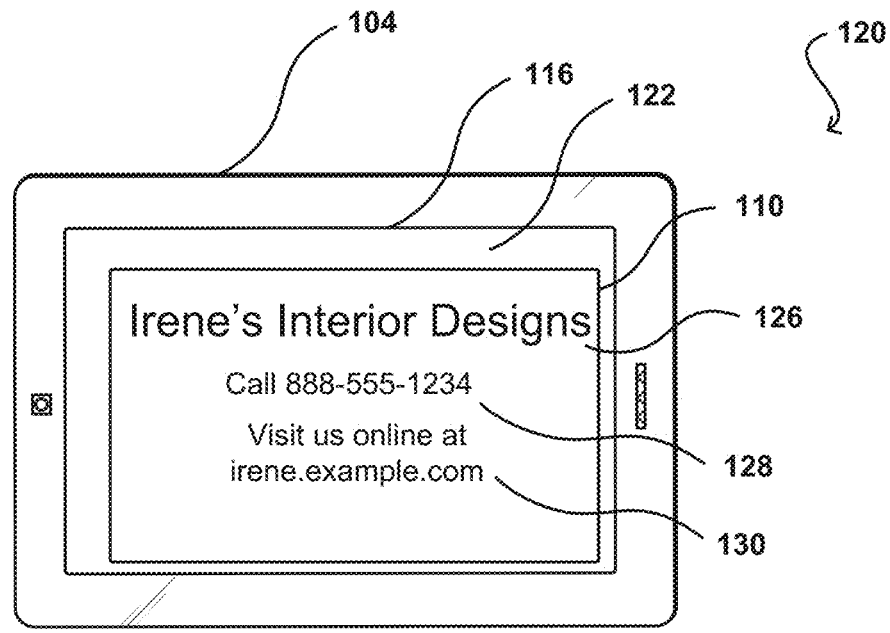

As shown in FIG. 1(b), the image 122 can be a still image that was captured by the camera, or can be a frame of a "live" view as captured by a video mode of the camera, camera mode of the device, etc. As illustrated, the image 122 can include information from the document 110. For example, in the example of FIG. 1(b), the information includes a string of text 126, a phone number 128, and a web address or URL 130.

Using a conventional approach, each image 122, or frame in a video, can be analyzed using software running on, or remote from, the computing device 104, to identify and separately track one or more "objects" as those objects move across newly captured frames. Some examples of objects that can be identified and tracked in an image or frame include text, products, (books, CDs, DVDs), bar codes, Uniform Resource Locators (URLs), e-mail addresses, phone numbers, etc. An object, also referred to herein as an entity, represents actionable information that can be identified and emphasized as the image 122 is being presented on the display screen 116 to convey to the user 102 that an object has been identified, as illustrated in the example situation 140 of FIG. 1(c).

Figure 1C:
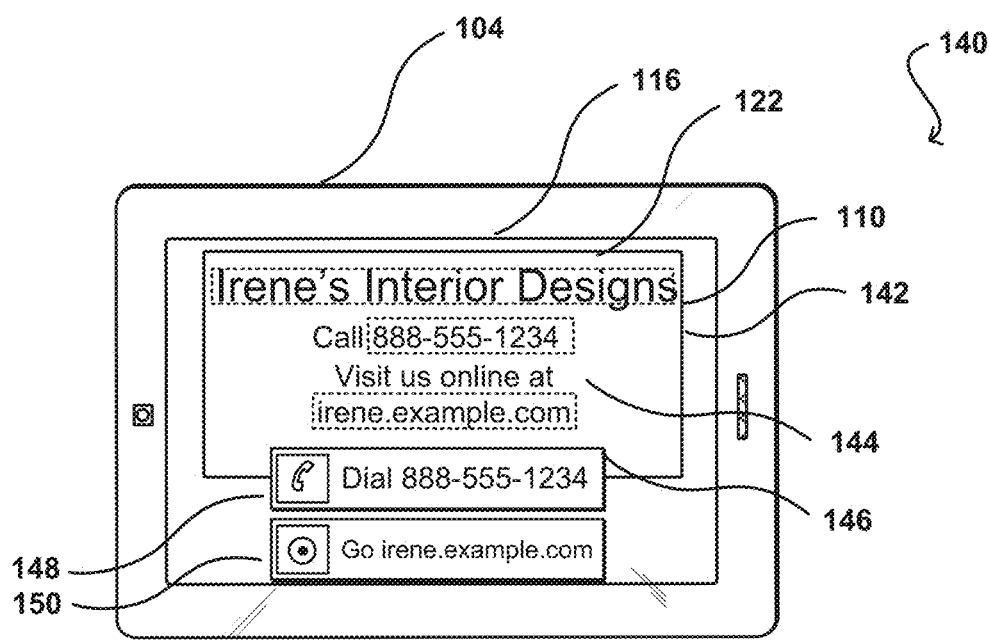

FIG. 1(c) illustrates an example augmentation of the image 122 after identification of the objects. For example, as shown in FIG. 1(c), the objects detected in the document 110 are being emphasized to the user 102 on the display screen 116. In particular, the string of text 126 that was identified in FIG. 1(b) is now shown with a bounding box 142 encompassing the text. Similarly, a bounding box 144 is shown as encompassing the phone number 128 in the document 110 and another bounding box 146 is encompassing the web address or URL 130.

Naturally, objects identified can be emphasized in various ways including, for example, using a different bounding shape, highlighted text, different fonts or font size, text effects, etc. In some embodiments, a virtual firefly effect can be used to emphasize identified objects. That is, small points or circles that flash from invisible or transparent to a bright white or yellow light, for example, similar to how fireflies light in nature, can encompass an identified object. Further, in some embodiments, the display screen 116 can present options for performing actions based in part on an identified object. For example, in FIG. 1(c), an option 148 is presented for dialing the phone number 128 that was identified in the document 110, together with an option 150 for launching a web browser to open the identified URL 130. Other options can be presented, for example, for performing a web search on the identified string of text 126.

In instances where the image 122 is a frame of a "live" view as captured by a video mode of the camera, the display 116 will be continuously updated with new frames that are captured by the camera. Further, different objects may be identified in different frames depending on various factors such as image quality. For example, products captured in an image may be identified even if the image quality is blurry whereas text captured in the same image may not be identified because the image is too blurry to accurately perform optical character recognition (OCR).

Thus, under conventional approaches, the computing device 102 generally needs to be able to separately track each identified object 142, 144, and 146, as the field of view of the camera changes, so that the location and identification of each object can be accurately conveyed to the user 102, as described above. Since each identified object 142, 144, and 146 would need to be tracked individually in each new frame that is captured by the camera, this approach can be computationally intensive and can affect the computing device's battery life.

Accordingly, approaches in accordance with various embodiments are configured to determine locations of identified objects in frames captured by the camera using scene-based tracking without individually having to track the identified objects, as described below.

Figure 2A:
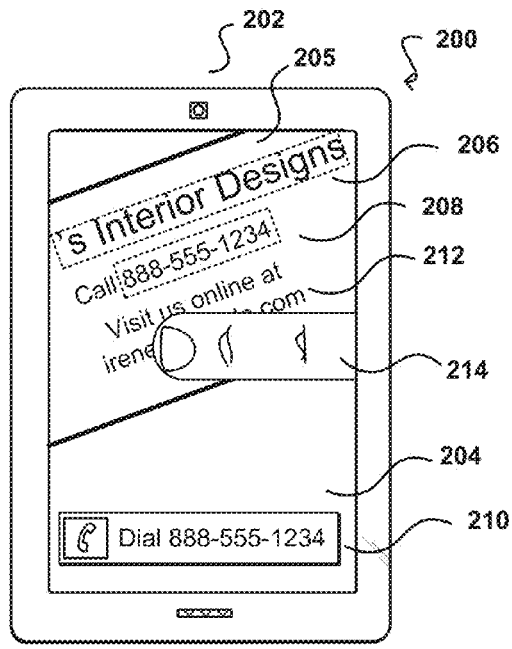
FIGS. 2(a)-(d) illustrate example approaches for scene-based object tracking in accordance with various embodiments.

FIG. 2(a)-(d) illustrate approaches for scene-based object tracking in accordance with various embodiments. For example, FIG. 2(a) illustrates an example situation 200 in which the portion of the image from FIG. 1(b) is again displayed on a display screen of the computing device 202 as a frame of a video being captured by the computing device.

In some embodiments, the computing device 202 is configured to continuously track scenes captured in the live view. As used herein, a scene refers to a static planar surface, for example, the surface of a document or a product (e.g., book, product package, a DVD surface, etc.). Further, tracking a scene generally includes tracking changes to the scene between frames, for example, with respect to rotation, translation, or scale.

For example, as soon as the computing device 202 starts capturing video information, beginning from the first captured frame, the device continuously estimates and stores a homography for each pair of captured neighboring frames. Generally, a homography relates a pair of images of the same planar surface in space in the form of an estimated homography matrix. Thus, the homography can be used to measure a transformation of a scene between neighboring frames. Homographies can be estimated using generally known techniques including, for example, Random Sample Consensus (RANSAC).

Figure 3:
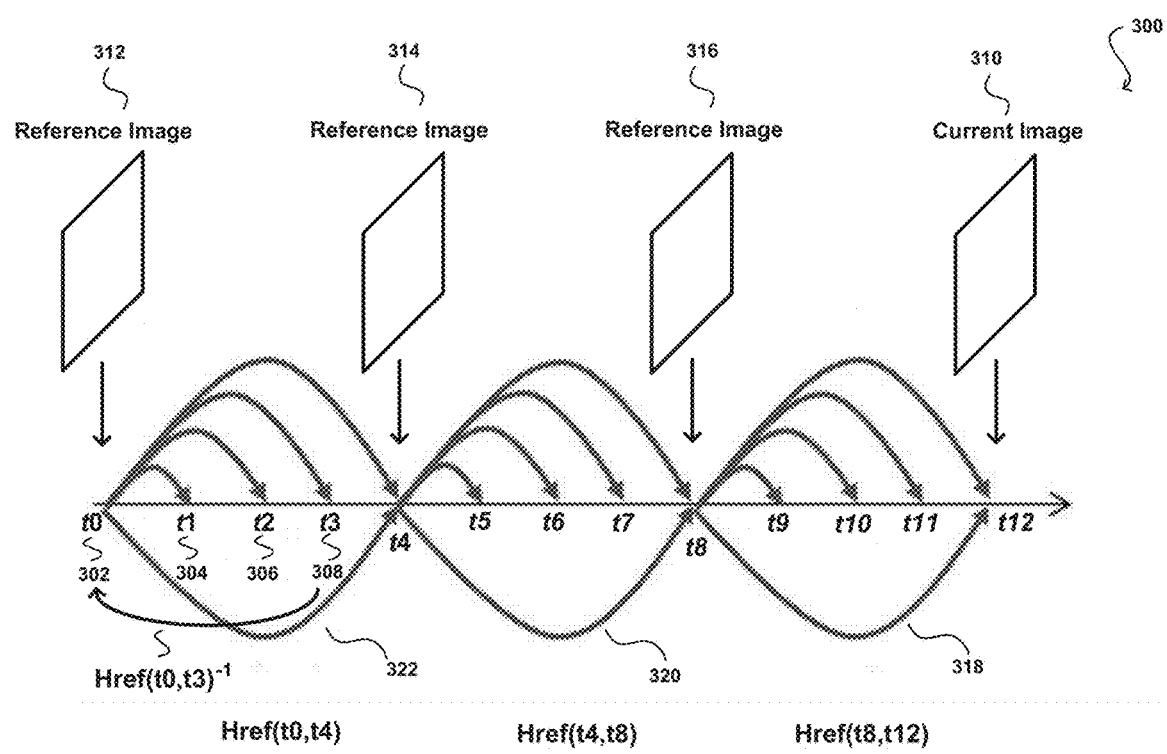
FIG. 3 illustrates an example schematic for an approach for determining a transformation of a scene.

For example, as illustrated in FIG. 3, the device estimates and stores a first homography between a first frame 302 captured at time t0 and a second frame 304 captured at time t1, a second homography between the second frame 304 captured at time t1 and a third frame 306 captured a time t2, a third homography between the third frame 306 captured at time t2 and a fourth frame 308 captured a time t3, etc.

This operation is performed independent of whether or not objects were identified in the captured frames. Each homography represents a change in the scene captured by the device in a first frame and a second frame, for example, with respect to rotation, translation, and scale. However, in some embodiments, the device is configured to selectively estimate and store homographies between frames that satisfy one or more criteria. For example, the device can estimate and store homographies between frames in which at least one object was identified. In some embodiments, captured frames that suffer from quality issues, for example, frames that are blurry frames, have poor image quality, too much shade, or moving objects, are not used for computing and storing homographies. Additionally, the quality of a homography matrix can be evaluated based in part on generally known techniques for testing homographies and features. For example, the number of inliners between frames for which the homography is estimated, geometric proportion between the frames, and feature distances between the frames, can all be evaluated when determining whether to reject a homography.

As mentioned, a homography relates a pair of images of the same planar surface in space in the form of an estimated homography matrix. Referring again to FIG. 3, to determine a location of an object that was identified in the frame 308, which was captured at time t3, in a currently captured frame 310, which was captured at time t12, a change of the scene between the frame 302 and the currently captured frame 310 is determined. The location of the object as identified in the frame 308 can then be updated with respect to the transformation (e.g., rotation, translation, scale) of the scene from the frame 308 to the current frame 310. Under conventional approaches, the change of the scene can be determined by multiplying homographies for each pair of neighboring frames, starting from the first frame 302 and up to the current frame 310. This estimation can be represented mathematically as follows:

$$H=H(t0,t1)*H(t1,t2)*H(t2,t3)*H(t3,t4)*H(t4,t5)*H(t5,t6)*H(t6,t7)*H(t7,t8)*H(t8,t9)*H(t9,t10)*H(t10,t11)*H(t11,t12)$$

where H is the estimated homography between the first frame taken at time t0 and the current frame taken at time t12, where H(t0,t1) is the estimated homography between the frames at time t0 and time t1, where H(t1,t2) is the estimated homography between the frames at time t1 and time t2, where H(t2,t3) is the estimated homography between the frames at time t2 and time t3, where H(t3,t4) is the estimated homography between the frames at time t3 and time t4, where H(t4,t5) is the estimated homography between the frames at time t4 and time t5, where H(t5,t6) is the estimated homography between the frames at time t5 and time t6, where H(t6,t7) is the estimated homography between the frames at time t6 and time t7, where H(t7,t8) is the estimated homography between the frames at time t7 and time t8, where H(t8,t9) is the estimated homography between the frames at time t8 and time t9, where H(t9,t10) is the estimated homography between the frames at time t9 and time t10, where H(t10,t11) is the estimated homography between the frames at time t10 and time t11, and where H(t11,t12) is the estimated homography between the frames at time t11 and time t12.

Since many frames can be captured as part of the live view, determining changes to the scene between a first time and a second time can become rather complex as time goes on. Further, this approach can result in a large multiplicative error, i.e., drift, in the estimated homography.

Thus, in some embodiments, to reduce the number of multiplications that are needed to estimate a change of a scene between frames (or times), some of the captured frames are selected as reference frames using various criteria. These reference frames are then used to estimate homographies between frames to determine transformations of a scene between frames. Using the example discussed above, in FIG. 3, the frame 312 at time t0, the frame 314 at time t4, the frame 316 at time t8, were selected as reference frames. Under this approach, to estimate a change of the scene between the frame 308 captured at time t3 and a currently captured frame 310 at time t12, a first homography for the reference image 316 captured at time t8 and the current image 310 captured at time t12 is multiplied with a second homography for the reference image 314 captured at time t4 and the reference image 316 captured at time t8, a third homography for the reference image 312 captured at time t0 and the reference image 314 captured at time t4, and an inverse of a fourth homography for the image 308 captured at time t3 and the reference image 312 captured at time t0. This estimation can be represented mathematically as follows:

$$H=Href(t8,t12)*Href(t4,t8)*Href(t0,t4)*H(t0,t3)^{-1}$$

where H is the estimated homography between the frame 308 taken at time t3 and the current frame 310 taken at time t12, where Href(t8,t12) is the estimated homography 318 between the third reference frame 316 and the current frame 310, where Href(t4, t8) is the estimated homography 320 between the second reference frame 314 and the third reference frame 316, where Href(t0, t4) is the estimated homography 322 between the first reference frame 312 and the second reference frame 314, and where H(t0, t3)$^{-1}$ is the inverse of the estimated homography between the frame 308 captured at time t3 and the first reference frame 312.

Since many frames are captured as part of the live view, reference frames need to be updated from time to time to ensure that changes to the scene in newly captured frames can still be estimated accurately. Thus, each captured frame can be evaluated to determine whether it should be selected as an updated reference frame.

In the example of FIG. 3, the current frame 310 can be selected as a reference frame when one or more conditions are satisfied. In some embodiments, the current frame 310 is selected as a reference frame if the translation between the last reference frame 316 and the current frame 310 exceeds a specified threshold. For example, if the overlap between the scene in the reference frame 316 and the scene in the current frame 310 is at least a threshold percentage, e.g., 20, 30, . . . , 60 percent, then the current frame 310 is selected as an updated reference frame.

In some embodiments, the current frame 310 is selected as a reference frame if a change in the scale of the scene in the reference frame 316 and a scale of the scene in the current frame 310 satisfies a threshold, e.g., 0.1, 0.2, . . . , 0.5, is below a minimum scale threshold, or exceeds a maximum scale threshold. For example, if the scale of the scene in the current frame 310 is two times smaller than the scale of scene in the last reference frame 316, for example, as a result of the user moving the computing device away from the captured scene (along the z-axis), then the current frame 310 is selected as an updated reference frame. Similarly, if the scale of the scene in the current frame 310 is two times larger than the scale of scene in the last reference frame 316, for example, as a result of the user moving the computing device toward the captured scene (along the z-axis), then the current frame 310 is selected as an updated reference frame.

In some embodiments, the current frame 310 is selected as a reference frame if the image focus of the current frame 310 improves over the image focus of the last reference frame 316 by a threshold amount, e.g., 20, 30, . . . , 60 percent. For example, the current frame 310 can be selected as an updated reference frame if the sharpness of the current frame 310 exceeds a sharpness of the reference frame 316 multiplied by a specified coefficient.

In some embodiments, respective feature descriptors for each reference are stored. When a new frame is captured, a feature descriptor of the new frame can be compared to the respective feature descriptors for the reference frames. If the feature descriptor of the new frame matches one of the feature descriptors for the reference frames, then the new frame is not considered as a candidate for being selected as an updated reference frame, since the previously stored matching reference frame can still be used for estimating homographies. Similarly, respective feature descriptors for reference frames can be compared against each other to identify matching reference frames that capture the same scene. If a match between reference frames is found, then the number of matching reference frames can be reduced so that only one reference frame is used for estimating homographies. For example, earliest stored reference frame can be kept while reference frames selected later in time are deleted.

Referring again to FIG. 2(a), the computing device 202 starts capturing video information, beginning from the first captured frame, and continuously estimates and stores a homography for each pair of captured neighboring frames, as described above. In some embodiments, the first captured frame that includes a valid scene is selected as an initial reference frame.

In FIG. 2(a), the display screen of the device is displaying a scene 204 in the first captured frame that includes a business card 205. As mentioned, software running on the computing device 202 can identify objects in each captured frame, as described above. Further, the software enables the device to convey which objects have been recognized, such as by displaying graphical elements over a live view of frame (e.g., video) information being captured by the computing device. In FIG. 2(a), the device has identified, in the business card 205, a string of text 206 and a phone number 208. The respective locations of the identified objects 206 and 208 in the scene 204 can be determined and stored. For example, each identified object 206 and 208 can have corresponding coordinates (e.g., pixel coordinates) that can be used to place bounding boxes around the objects. These coordinates correspond to a time at which the identification occurred, i.e., the time at which the scene 204 was captured. This information can be used to determine respective locations of the objects 206 and 208 in subsequent frames based in part on the transformation of the scene between the time at which the scene 204 was captured and a time at which the scene is captured in a frame in the future, as described above.

In FIG. 2(a), respective bounding boxes for both the string of text 206 and the phone number 208 are being displayed over the live view to convey to the user that these objects have been recognized. The respective locations of the identified objects 206 and 208 can be used to identify the locations of these objects in frames captured in the future. Further, an option 210 for performing an action in response to identifying the phone number 208 is presented to allow the user to make a phone call to that phone number. Although the business card 204 also includes a partially visible URL 212, this object has not been identified by the device since the finger 214 of the user in the captured frame is concealing this information.

Figure 2B:
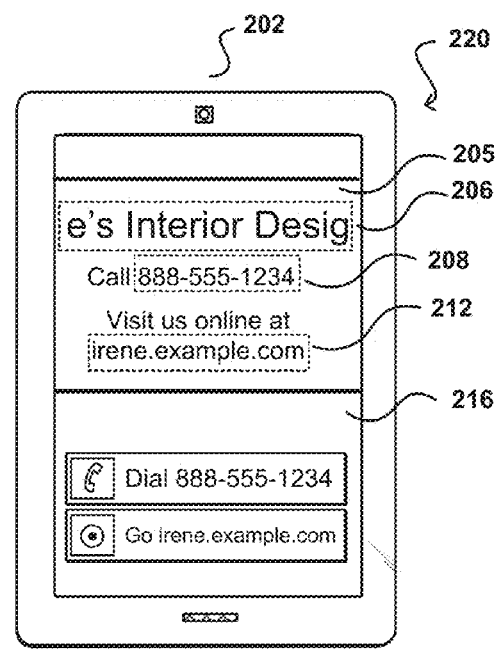

FIG. 2(b) illustrates another example scene 216 captured subsequent to the scene 204 captured in the frame displayed in FIG. 2(a). In FIG. 2(b), the device has identified, in the business card 205, the string of text 206, the phone number 208, and the URL 212. The respective locations of the identified object 212 in the scene 216 can be determined and stored for scene-based tracking purposes, as described above. The device can track the locations of the text 206 and the phone number 208 using scene-based tracking. For example, the device can determine a change (or transformation) between the scene 204, which is a reference frame, and the scene 216 using the approaches described above. The device can then update the locations of the objects 206 and 208, as determined using the scene 204, with respect to the change in the scene between the scene 204 and 216. The device can then display respective bounding boxes for both the string of text 206 and the phone number 208 at the updated locations in the scene 216 to convey to the user that these objects have been recognized. The device can then determine whether the scene 216 should be used as an updated reference frame, as described above. In this example, the scene 216 is selected as an updated reference frame.

Figure 2C:
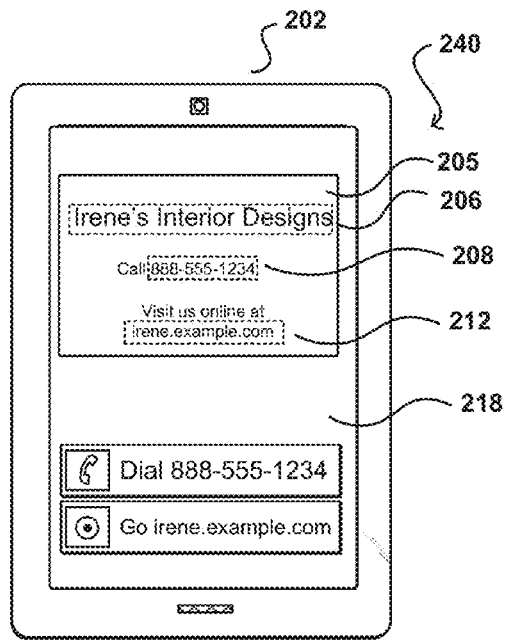

FIG. 2(c) illustrates another example scene 218 captured subsequent to the scene 216 captured in the frame displayed in FIG. 2(b). In FIG. 2(c), the device has tracked the locations of the text 206, the phone number 208, and the URL 212 using scene-based tracking. As illustrated in FIG. 2(c), the device is able to track the objects 206, 208, and 212 based on the scene 218 regardless of whether the objects 206, 208, and 212 become too small to identify, for example, as a result of the scale of the scene 218 being decreased.

For example, to track the objects 206 and 208, the device can determine a change (or transformation) between the scene 204 in which the objects 206 and 208 were identified and the scene 216 based at least in part on a transformation of the scene using the first reference frame 204 and the second reference frame 216. The device can then update the locations of the objects 206 and 208, as determined using the scene 204, with respect to the change in the scene between the scene 204 and scene 218.

Similarly, the device can track the object 212 identified in the scene 216 by determining a change (or transformation) between the scene 216 in which the object 212 was identified and the scene 218 based at least in part on a transformation of the scene using the first reference frame 204 and the second reference frame 216. The device can then update the location of the object 212, as determined using the scene 216, with respect to the change in the scene between the scene 216 and 218. As mentioned, the device can then display respective bounding boxes for the tracked string of text 206, the phone number 208, and the URL 212 at the updated locations in the scene 218 to convey to the user that these objects have been recognized.

In some instances, when displayed, the bounding boxes (or any other graphical element used to emphasizing the identified object as described herein) may exhibit a "jittering" effect that may result from errors in the homography estimation between scenes. Thus, in some embodiments, adaptive smoothing is applied to a homography being used to track objects based in part on an estimated motion of the device. As used herein, smoothing generally refers to approximating function that attempts to capture important patterns in the data, while leaving out noise. In smoothing, the data points of a signal are modified so individual points (presumably because of noise) are reduced, and points that are lower than the adjacent points are increased leading to smoother data. The homography can be smoothed using optical flow estimation to estimate a motion of the computing device being used to capture the scenes. The optical flow can be calculated based on a global translation of the scenes. If no motion of the computing device is detected, then smoothing is applied as described above. However, if motion is detected, a smoothing coefficient is reduced in proportion to the motion to reduce the amount of smoothing that is applied to the homography.

Figure 2D:
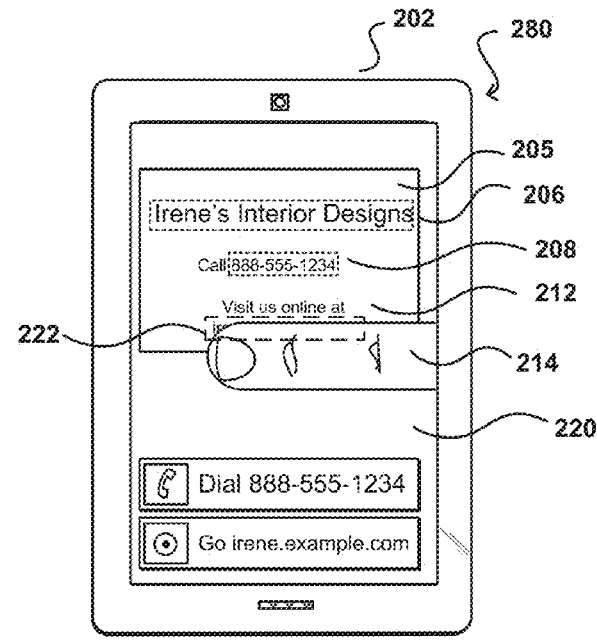

FIG. 2(d) illustrates another example scene 220 captured subsequent to the scene 218 captured in the frame displayed in FIG. 2(c). In FIG. 2(d), the device has tracked the locations of the text 206, the phone number 208, and the URL 212 using scene-based tracking, as described above. Since the objects 206, 208, and 212 are not tracked individually but rather are tracked in relation to changes to the scenes, there may be instances where the tracked location of an object is not valid in a newly captured frame because the object has somehow been obscured. As shown in FIG. 2(d), the URL 212 is no longer visible in the captured scene 220 because a finger 214 of the user is now obscuring the URL 212. In such instances, it may not be desirable to convey to the user that the URL 212 has been recognized, since the URL 212 is not visible in the scene 220.

Thus, in some embodiments, signature verification for an object is performed before highlighting a particular region in a displayed frame (e.g., placing a bounding box). That is, a feature profile for the object (e.g., a feature descriptor) is compared against a local feature profile of the region (e.g., feature descriptor) that is to be highlighted in the displayed frame. If the feature profile for the object matches the local feature profile for the region, then the region is highlighted to indicate to the user that the object has been recognized in the region. In the example of FIG. 2(d), before placing the bounding box for the URL 212, the device compares the feature profile for the object 212 and the local feature profile for the region 222 at which the bounding box is to be placed. As shown in FIG. 2(d), the finger 214 is now placed in the region 222 in which the bounding box is to be placed. Thus, the device will compare the feature profile for the URL 212 and the local feature profile for the region that includes the finger 214. In this instance, the feature profiles will not match and, although the device is still able to determine the location of the URL 212 in the scene 220 using the scene-based tracking, the device will not display the bounding box for the URL 212 in the displayed frame since the URL is being obscured by the finger 214.

In some instances, objects being tracked using scene-based tracking may get lost, i.e., may no longer be able to be identified in newly captured frames. For example, if the newly captured frames are too blurry, are captured when the device is enduring lots of motion, or capture an entirely different scene, then the transformation of the scene across the poor quality frames may result in the device may result in the device not being able to track the objects accurately, since the scene is likely changing drastically between the poor quality frames. If signature verification for the tracked objects fails across a threshold number of newly captured frames, then the device can attempt to re-detect the objects.

Thus, in some embodiments, when attempting to re-detect objects, the device can process a newly captured frame, for example, a frame that is not poor quality, to extract feature descriptors (e.g., compressed feature descriptors) for regions in the newly captured frame. These extracted feature descriptors can be compared against the respective profiles of the tracked objects. If a match is found for at least one tracked object, then the device has successfully re-detected the at least one tracked object in the newly captured frame. The match need not be identical but rather may satisfy a similarity threshold. Upon re-detection of the object in the newly captured frame, the device can use the newly captured frame as a reference frame to re-initialize the scene-based tracking.

Figure 4A:
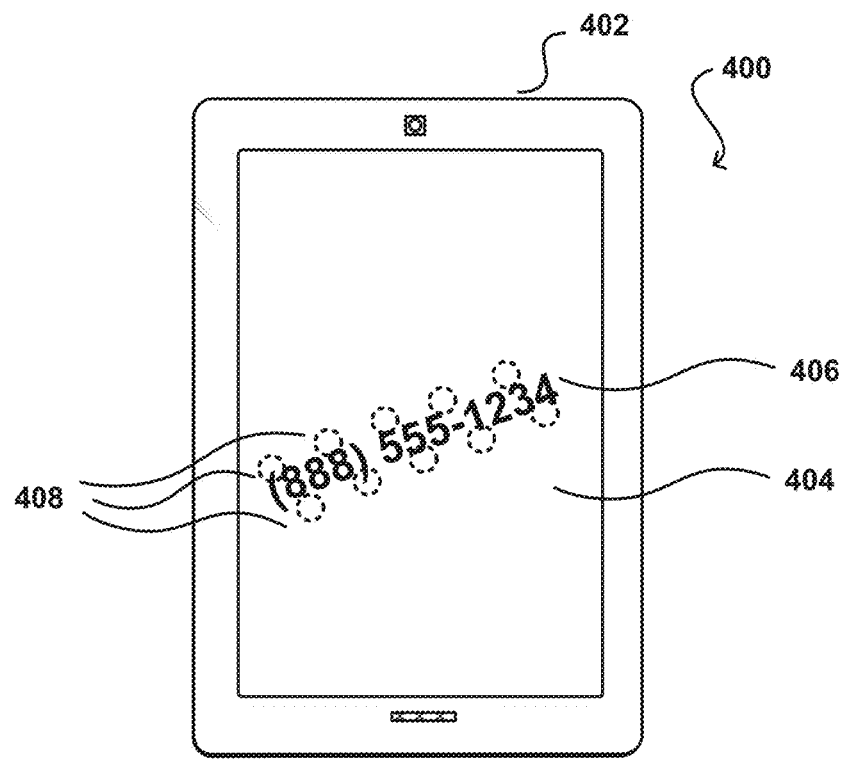
FIGS. 4(a)-(b) illustrate example approaches for homography estimation in accordance with various embodiments.
Figure 4B:
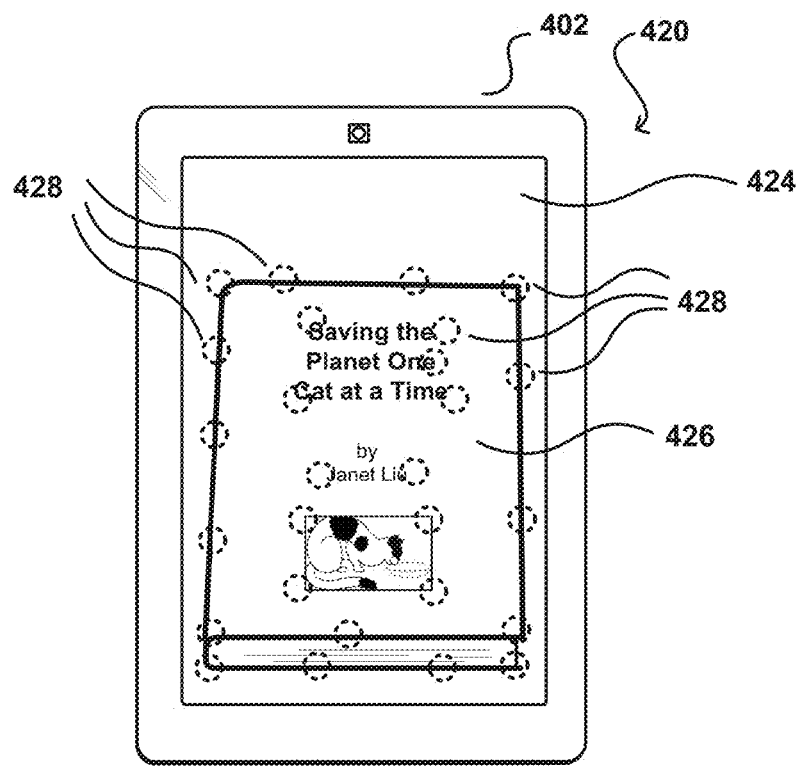

FIG. 4(a)-(b) illustrate approaches for homography estimation in accordance with various embodiments. For example, in some embodiments, homographies can be estimated using an adaptive approach based in part on the scene being tracked. As illustrated in FIG. 4(a), the display screen of the device 402 is displaying a scene 404 that includes a line of text 406. FIG. 4(a) also illustrates feature points 408 corresponding to the line 406 that are used to estimate a homography between scenes including the line of text 406. In some embodiments, when the feature points 408 are distributed along one or more lines, then the device is configured to estimate homographies between scenes that include the line of text 406 using fewer parameters, for example, five or six degrees of freedom.

FIG. 4(b) illustrates the display screen of the device 402 as displaying a scene 424 that includes a book 426. FIG. 4(b) also illustrates feature points 428 corresponding to the book 426 that are used to estimate a homography between scenes including the book 426. In some embodiments, when the feature points 428 are uniformly distributed in the scene 424, then the device is configured to estimate homographies between scenes that include the book 426 using eight degrees of freedom.

In some embodiments, regularization can be applied to a homography based in part on a classification of the captured scene. For example, a shape of the distribution of feature points in the frames for which the homography is being estimated can be used to control a regularization parameter that is then applied to the homography.

Figure 5:
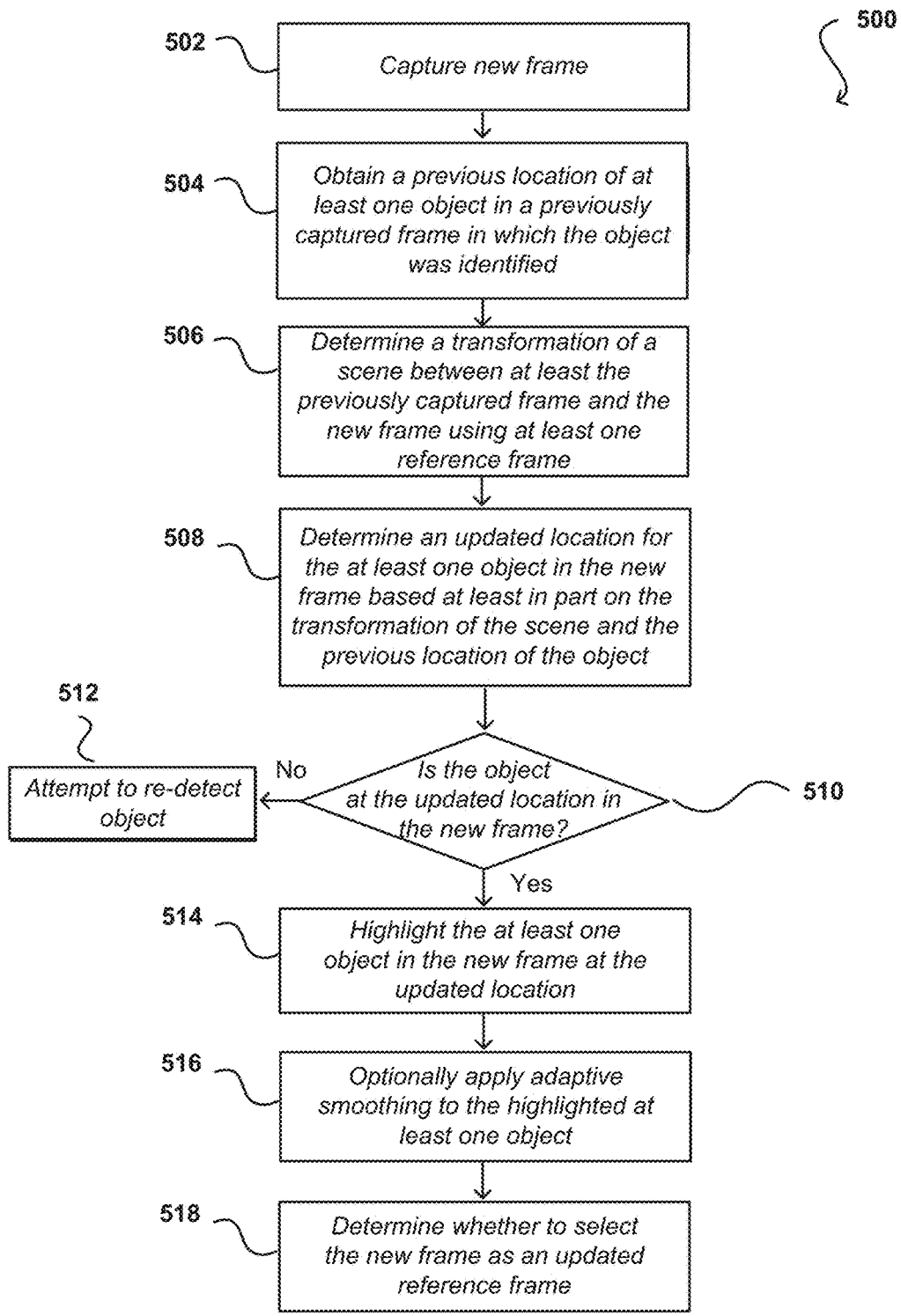
FIG. 5 illustrates an example process for scene-based object tracking that can be used in accordance with various embodiments.

FIG. 5 illustrates an example process 500 for scene-based object tracking that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a computing device captures a new video frame, for example, as part of a "live view" 502.

Software running on the device can identify objects in captured frames. The device can store information about an identified object including, for example, a time (or frame) at which the object was captured and a location of the object (e.g., pixel coordinates or bounding box). In some embodiments, the device also determines and stores a feature profile for the identified object to be used for signature verification. When the new frame is captured, the device can use this information to attempt to determine an updated location of the object in the new frame. For example, to determine an updated location for an object that was identified in a previously captured frame, the device can first obtain the location of the object in the previously captured frame 504.

The device determines a transformation of the scene from the previously captured frame in which the object was identified and the new frame 506. As mentioned, at least one reference frame is utilized to compute this transformation in an efficient manner. The device is able to determine an updated location for the object in the new frame by adjusting the location of the object in the previously captured frame with respect to the transformation of the scene between the previously captured frame and the new frame.

The device can then convey to a user operating the computing device that the object has been recognized at the updated location, for example, by placing a bounding box at the updated location. In some embodiments, before placing the bounding box, the device determine if the object is indeed still present at the updated location in the new frame 510. The device can make this determination by comparing a feature descriptor of the object and a local feature descriptor of the region at the updated location, as described above. If the feature descriptors match, then the object is still present at the updated location in the new frame. The device can then highlight the object in the new frame, for example, by placing a bounding box, at the updated location 514. The device can optionally apply adaptive smoothing when placing the bounding box, as described above 516. If the feature descriptors do not match, then the device can attempt to re-detect the object to re-initialize the scene-based object tracking 512. The device can determine whether the new frame should be stored as an updated reference frame to be used in future scene transformation calculations 518, as described above.

Figure 6:
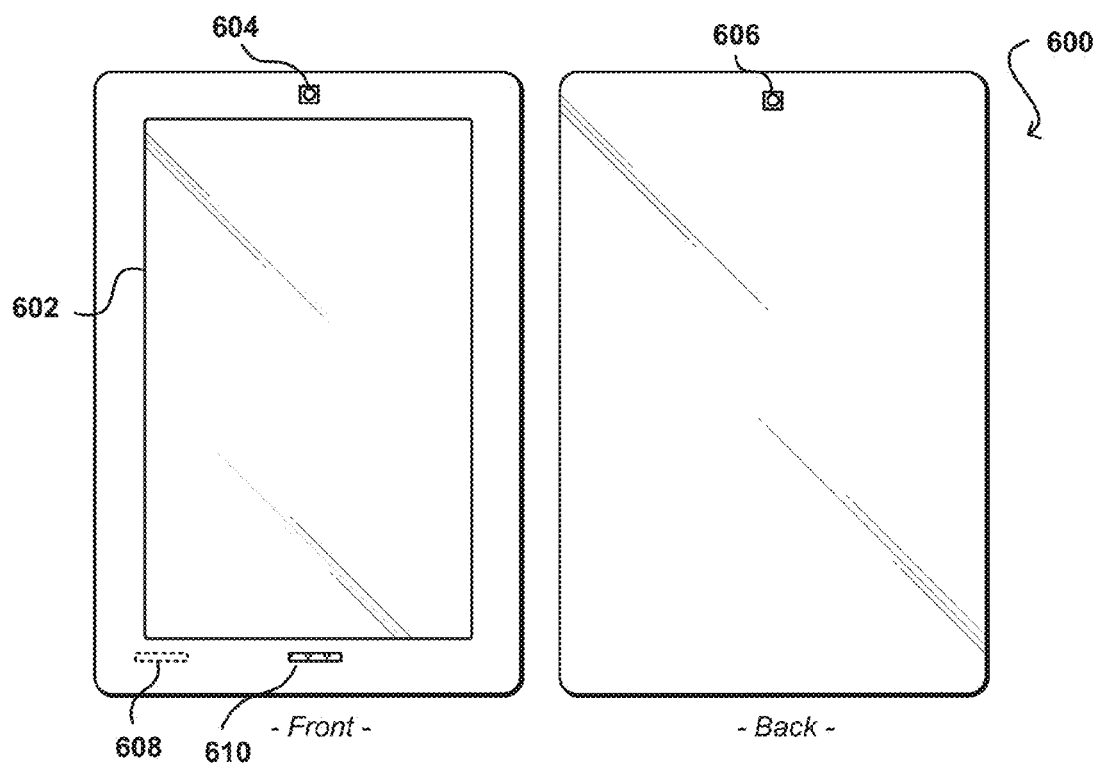
FIG. 6 illustrates an example computing device that can be used in accordance with various embodiments.

FIG. 6 illustrates an example computing device 600 that can be used to perform methods in accordance with various embodiments discussed and suggested herein. In this example, the device has a primary display screen 602 for displaying information and content to a user. The device also has two cameras 604, 606 positioned at the front and back faces of the device, respectively. It should be understood that fewer or additional cameras or other such image capture elements or sensors can be positioned at various other locations on such a device as well. In this example, each capture element is a camera capable of capturing image information over a visible and/or infrared (IR) spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices.

In this example, a light sensor can be used to determine an amount of light in a general direction of objects to be captured. At least one illumination element, such as a white light emitting diode (LED) or infrared (IR) emitter, can be used to provide illumination in a particular range of directions when, for example, there is insufficient light as determined by the light sensor. In some embodiments, there can be an emitter for each of the image capture elements, with each emitter positioned proximate the respective image capture element. Various other elements and combinations of elements can be used as well within the scope of the various embodiments as should be apparent in light of the teachings and suggestions contained herein. The device can include at least one networking component 608, enabling the device to communicate with at least one remote system or service, such as may be used to identify objects or obtain information relating to identified objects. The device also can include at least one microphone 610 or other such sensor for capturing audio data.

Figure 7:
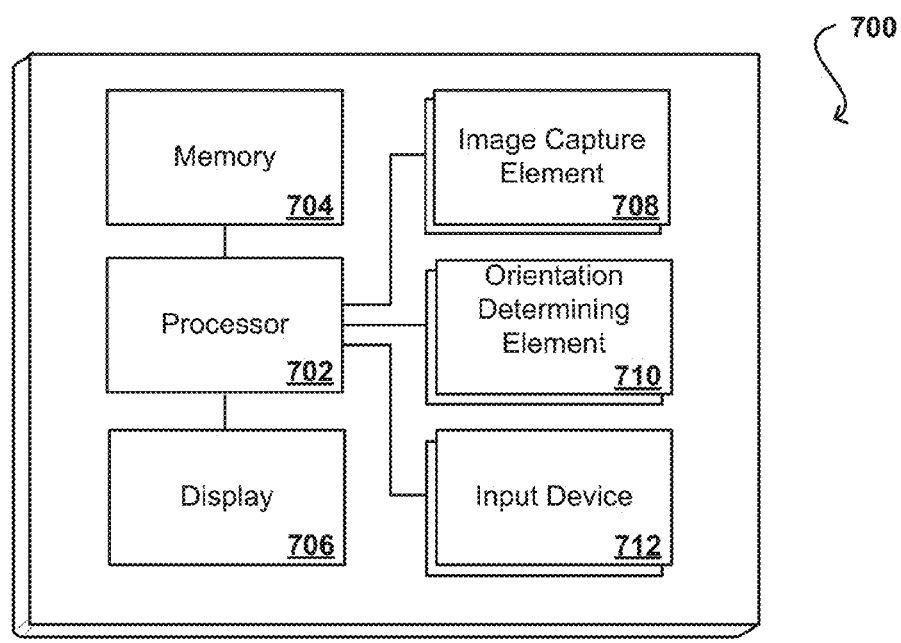
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or other type of non-transitory computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The example device includes at least one orientation determining component 710, such as an electronic gyroscope used to determine motion of the device for assistance in acquiring focused images. The device also can include at least one illumination element, as may include one or more light sources (e.g., white light LEDs, IR emitters, or flash lamps) for providing illumination and/or one or more light sensors or detectors for detecting ambient light or intensity, etc.

The example device can include at least one additional input device 712 able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
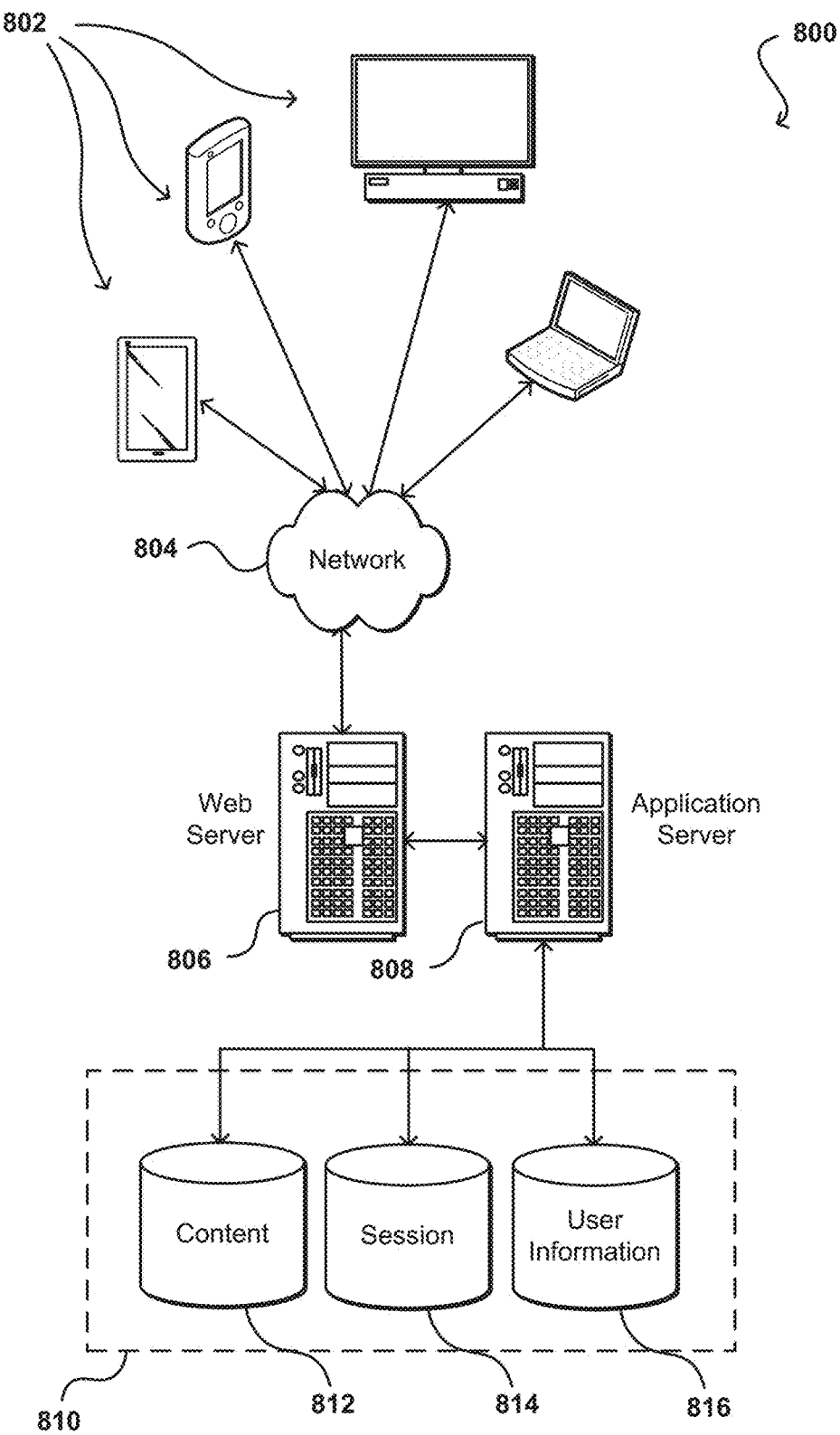
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
  a display screen;
  a camera;
  at least one processor;
  memory including instructions that, when executed by the at least one processor, enables the computing device to perform the operations of:
    capturing a first frame of video using the camera and selecting the first frame as a first reference frame;
    capturing a second frame of video using the camera and determining a first transformation between the first reference frame and the second frame, wherein the second frame is captured subsequent in time to the first frame;
    capturing a third frame of video using the camera and determining a second transformation between the first reference frame and the third frame, wherein the third frame is captured subsequent in time to the second frame;
    capturing a fourth frame of video using the camera, selecting the fourth frame as a second reference frame, and determining a third transformation between the first reference frame and the second reference frame, wherein the fourth frame is captured subsequent in time to the third frame;
    capturing a fifth frame of video using the camera and determining a fourth transformation between the second reference frame and the fifth frame, wherein the fifth frame is captured subsequent in time to the fourth frame;
    capturing a sixth frame of video using the camera and determining a fifth transformation between the second reference frame and the sixth frame, wherein the sixth frame is captured subsequent in time to the fifth frame;
    determining, using the third frame of video, a first location of an object in the third frame; and
    determining a second location of the object in the sixth frame using (i) the first location of the object in the third frame, (ii) an inverse of the second transformation between the first reference frame and the third frame, (iii) the third transformation between the first reference frame and the second reference frame, and (iv) the fifth transformation between the second reference frame and the sixth frame.

2. The computing device of claim 1, wherein the first transformation is a first homography, the second transformation is a second homography, the third transformation is a third homography, the fourth transformation is a fourth homography, the fifth transformation is a fifth homography.

3. The computing device of claim 1, wherein a transformation is not determined between the second frame and the third frame, a transformation is not determined between the third frame and the fourth frame, and a transformation is not determined between the fifth frame and the sixth frame.

4. The computing device of claim 1, wherein the operations further comprise:
  determining, using the sixth frame of video, a third location of the object in the sixth frame; and
  selecting the sixth frame as a third reference frame based at least in part on a difference between the second location and the third location.

5. A computer implemented method, comprising:
  capturing a first frame of video using a camera;
  selecting the first frame as a first reference frame;
  capturing a second frame of video using the camera and determining a first transformation between the first reference frame and the second frame, wherein the second frame is captured subsequent in time to the first frame;
  determining a first location of an object in the second frame using the second frame;
  capturing a third frame of video using the camera;
  selecting the third frame as a second reference frame; and determining a second transformation between the first reference frame and the second reference frame, wherein the third frame is captured subsequent in time to the second frame;
  capturing a fourth frame of video using the camera and determining a third transformation between the second reference frame and the fourth frame, wherein the fourth frame is captured subsequent in time to the third frame;
  determining a transformation between the second frame and the fourth frame using (i) an inverse of the first transformation between the first reference frame and the second frame, (ii) the second transformation between the first reference frame and the second reference frame, and (iii) the third transformation between the second reference frame and the fourth frame;
  determining a second location of the object in the fourth frame using (i) the first location of the object and (ii) the transformation between the second frame and the fourth frame; and
  placing on at least one display screen at least one graphical object in the fourth frame at the second location.

6. The computer implemented method of claim 5, wherein the first transformation is a first homography, the second transformation is a second homography, the third transformation is a third homography, and the transformation between the second frame and the fourth frame is a fourth homography.

7. The computer implemented method of claim 5, wherein a transformation is not determined between the second frame and the third frame.

8. The computer implemented method of claim 5, further comprising:
  determining, using the fourth frame of video, a third location of the object in the fourth frame; and
  selecting the fourth frame as a reference frame based at least in part on a difference between the second location and the third location.

9. The computer implemented method of claim 8, further comprising:
placing the at least one graphical element in the fourth frame at the third location on the at least one display screen, the graphical element conveying that the object is recognized in the fourth frame at the third location.

10. The computer implemented method of claim 9, further comprising:
determining that the object is present in the fourth frame at the third location based at least in part on a threshold similarity between a local feature profile corresponding to the object and a local feature profile of a region in the fourth frame corresponding to the third location.

11. The computer implemented method of claim 9, wherein placing the at least one graphical element at the third location further comprises:
applying smoothing to the transformation between the second frame and the fourth frame based at least in part on an amount of detected motion of a computing device.

12. The computer implemented method of claim 5, further comprising:
determining a change in scale between the third frame and the fourth frame; and
selecting the fourth frame as a third reference frame based at least in part on the change in scale.

13. The computer implemented method of claim 5, further comprising:
determining a change in translation between the third frame and the fourth frame; and
selecting the fourth frame as a third reference frame based at least in part on the change in translation.

14. The computer implemented method of claim 5, further comprising:
determining a change in image focus level between the third frame and the fourth frame; and
selecting the fourth frame as a third reference frame based at least in part on the change in image focus level.

15. A non-transitory computer readable storage medium storing instructions for scene-based object tracking, the instructions when executed by a computing device causing the computing device to:
capturing, using at least one camera, a plurality of frames of a video, wherein at least one frame in the plurality of frames is selected as a reference frame;
determining a first location of an object in an intermediate frame, the intermediate frame being captured subsequent in time to the reference frame and before a current frame, wherein at least one frame was captured between the reference frame and the intermediate frame, and wherein at least one different frame was captured between the intermediate frame and the current frame;
determining a transformation between the intermediate frame and the current frame using (i) an inverse of a transformation between the reference frame and the intermediate frame and (ii) a transformation between the reference frame and the current frame; and
determining a second location of the object in the current frame using (i) the first location of the object and (ii) the transformation between the intermediate frame and the current frame.

16. The non-transitory computer readable storage medium of claim 15, wherein instructions for determining the transformation further comprise:
determining that a threshold count of feature points in the current frame are distributed along at least one line; and
decreasing a number of parameters in a matrix being used to estimate a homography between the intermediate frame and the current frame.

17. The non-transitory computer readable storage medium of claim 15, wherein instructions for determining the transformation further comprise:
determining that a threshold count of feature points in the current frame are uniformly distributed; and
increasing a number of parameters in a matrix being used to estimate a homography between the intermediate frame and the current frame.

18. The non-transitory computer readable storage medium of claim 15, wherein instructions for determining the transformation further comprise:
determining a shape of a distribution of feature points in the current frame; and
adjusting a regularization parameter being used to estimate a homography between the intermediate frame and the current frame based at least in part on the determined shape.

19. The non-transitory computer readable storage medium of claim 15, wherein instructions further comprise:
display the current frame on a display screen of the computing device; and
insert, in the displayed frame, at least one graphical element positioned at the second location, the graphical element conveying that the at least one object is recognized in the current frame at the second location.

* * * * *